United States Patent Office 3,002,394
Patented Oct. 3, 1961

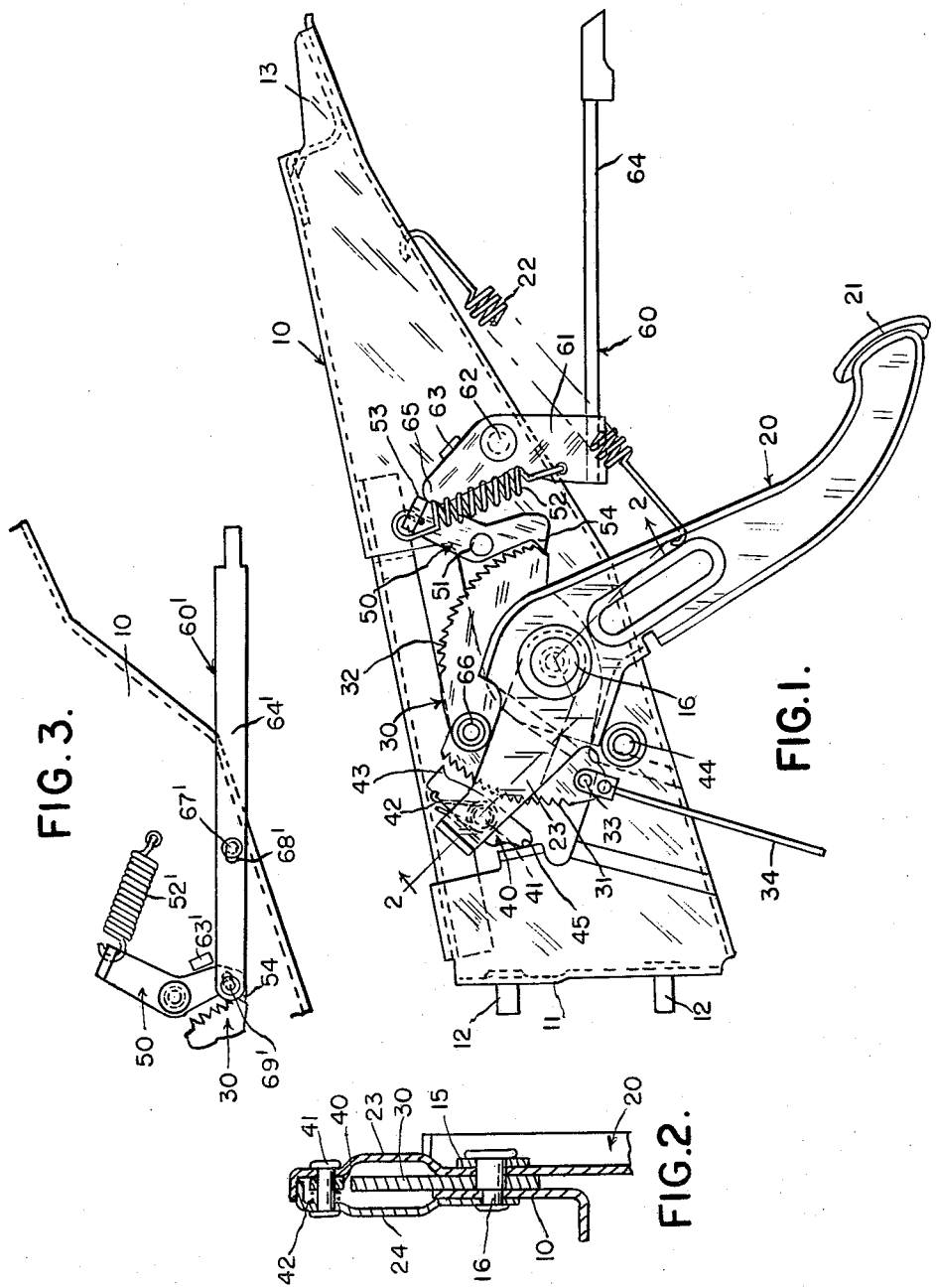

3,002,394
BRAKE ACTUATING MECHANISM
Albert S. Spisz, Livonia, Mich., assignor, by mesne assignments, to Lisle W. Menzimer, trustee, Rockford, Ill.
Filed Mar. 16, 1959, Ser. No. 799,532
2 Claims. (Cl. 74—152)

This invention relates to brake operating devices generally, and more particularly to foot operated brake actuating mechanism.

Foot operated brake actuating mechanisms are most commonly known as used on automotive vehicles. The brake operating device of this invention is of the type used with the parking or emergency brake on automotive vehicles. The parking brake system generally includes means for taking up the slack in a brake operating cable and then tensioning the cable to apply the brakes.

Most foot operated parking brake devices include a pivotally mounted lever which serves as the brake pedal. The brake pedal is mounted on the firewall or instrument panel of the vehicle and hangs down to an accessible position. The brake cable is connected to the brake pedal lever. The brake pedal lever is pivotally depressed to take up slack in the brake cable and to tension the cable and actuate the brakes. A releasable lock is normally provided to hold the brake lever depressed and the brakes engaged.

The effectiveness of a brake operating device of this type is dependent upon the operative stroke afforded the brake pedal lever. A long stroke enables taking up the slack and having more distance to travel in tensioning the brake operating cable. However, although a long operating stroke may be provided for, the full stroke may not be available. This can occur when the person operating the brake pedal cannot conveniently move the pedal through a full stroke, or when the pedal is at an inconvenient angle to apply braking pressure, where there is too much slack or play in the braking mechanism, or for any of a number of other reasons.

It is an object of the present invention to disclose a novel means of cable slack adjustment and/or cable tensioning suitable for brake operation or other purposes.

It is a further object of the present invention to disclose foot operated means of the type mentioned in the preceding paragraph.

It is a further object of the present invention to disclose a cable slack adjusting and tensioning means, for brake operation or other purposes, which may be pumped, or repeatedly stroked for further tensioning effort.

It is a further object of the present invention to disclose a foot operated device of the type last mentioned and having means for holding the operating cable taut while the foot pedal is released for a subsequent cable tensioning stroke.

It is a further object of the present invention to disclose a brake operating or other cable tensioning device having multiple stroke means of actuation and a singular tension relieving means.

A further specific object of the present invention is the disclosure of a device including all of the features mentioned to provide a foot operated vehicle parking or emergency brake having a minimum number of parts, which is inexpensively manufactured and assembled, compactly arranged, and easily installed for effective vehicle brake actuation.

Other objects and features of the invention will become apparent as the description proceeds, especially when taken in conjunction with the accompanying drawing, illustrating preferred embodiments of the invention, wherein:

FIGURE 1 is a side plan view of a foot operated vehicle parking brake including the different features of this invention.

FIGURE 2 is a cross-sectional view of the vehicle parking brake device of FIGURE 1, as seen in the plane of line 2—2, and looking in the direction of the arrows thereon.

FIGURE 3 is a side plan view of an alternate form of brake releasing means to that shown in FIGURE 1.

The foot operated parking brake device shown in the drawings includees a mounting plate 10 having a brake pedal lever 20 pivotally mounted thereon. A ratchet wheel member 30 of arcuate shape is pivotally mounted on the mounting plate with the brake pedal lever but is operable independently thereof. The brake operating cable is engaged to the ratchet wheel segment near one end thereof. A pawl 40 is mounted on the end of the brake pedal lever 20 which extends pasts its pivotal junction. This pawl 40 is spring-loaded to engage and move the ratchet wheel member 30 as the brake pedal lever is depressed. A second pawl 50 is mounted on the mounting plate 10 and is also disposed for engagement with the ratchet wheel member. The pawls 40 and 50 permit relative movement of the ratchet wheel member in opposite directions with respect to each other. Thus, as will be shown, the lever 20 can be pumped, or repeatedly stroked, to advance and hold the arcuate member in increasing cable tensioning positions.

A brake releasing mechanism 60 is adapted to release the holding pawl 50. The pawl 40 is removed from a release inhibiting position whenever the foot pedal lever is returned to its original position. When this occurs, member 30 is retained in advanced position by pawl 50, until this is released by releasing mechanism 60.

Referring now to the drawings, the mounting plate or support 10 is formed at one end to include a mounting flange 11 for engagement by studs 12 to the vehicle firewall. The other end of the mounting plate is formed as at 13 for engagement with the vehicle instrument panel.

The brake pedal lever 20 is mounted on the pivot pin 16. The lower end of the lever 20 is formed to include a foot pad 21. A tension spring 22 holds the foot pedal lever in a released position relative to the mounting plate 10. The other end of the lever forms an arm 23 which extends considerably beyond the pivot pin 16. A reversely complementary pivot arm member 24 is secured to the end of arm 23. It is disposed in parallel spaced relation to the extended end of the lever arm 23 and is supported on the pivot pin 16 in spaced relation thereto. This is best shown in FIGURE 2.

The arcuately shaped ratchet wheel member 30 is mounted on the pivot pin 16 between the arms 23 and 24 of the foot pedal lever 20. The ratchet wheel segment is not secured to either of the lever arms 23 and 24, or to the mounting plate 10, but is freely rotatable relative to both. The member 30 includes two separate arcuate segments, one near each end, formed to include ratchet teeth 31 and 32. A hole 33 is formed in one end of the ratchet wheel member for the connection of the brake operating cable 34 thereto.

The pawl 40 is pivotally mounted on a pin 41 provided between the ends of the connected lever arms 23 and 24. A spring 42 biases the end 43 of the pawl for engagement with the ratchet teeth 31 of the ratchet wheel member 30. The pawl 40 is adapted for motivating engagement with the ratchet teeth 31 when the foot pedal 20 is depressed and for free ratchet travel thereover on its return stroke.

A bumper stop 44 is provided on the mounting plate to limit the elevated position of the foot pedal lever 20. The stop 44 also disposes the end of the pawl 40 in engagement with an abutment 45 on the mounting plate. The abutment 45 holds the pawl 40 free of engagement with the ratchet wheel member 30.

The pawl 50 is pivotally mounted on a pivot pin connection 51 provided on the mounting plate 10. The pawl 50 has a tension spring 52 engaged to the end 53 thereof. The tension spring 52 holds the other end 54 of the pawl disposed for engagement with the ratchet teeth 32 of the ratchet wheel member 30. The ratchet teeth 32 are formed to ratchet past the pawl end 54 during clockwise movement of the arcuate member (with reference to FIGURE 1) and to lock with the pawl against counterclockwise movement thereof.

The release mechanism 60 is intended to release pawl 50 to enable the return of the ratchet wheel member 30 to its original position. Such mechanism includes a cam lever 61 pivotally mounted at 62 to the mounting plate or support 10. The pawl biasing spring 52 is engaged to the cam lever 61 and serves to hold it against a back stop 63 and out of engagement with the holding pawl. A release handle and rod connection 64 is engaged to the cam lever 61 to enable moving the cam end 65 of the lever 61 against the end 53 of pawl 50. This pivots the pawl end 54 out of engagement with the ratchet teeth 32 and enables the ratchet wheel member to return to its original position (under the influence of the tensioned brake cable 34). A bumper stop 66 is provided on the ratchet wheel member 30 to limit the relative travel afforded the wheel member. The stop 66 is disposed to engage the lever arm 23 of the foot pedal lever 20.

An alternate form of release mechanism is shown in FIGURE 3. Such alternate form of release device is identified 60'. In the alternate structure the pawl biasing spring 52' is engaged to the mounting plate 10. The release operating handle member 64' is supported on a pin 67' received in an elongated slot 68' formed therein. The handle member 64' is engaged to the tooth engaging end 54 of the holding pawl 50 by a slotted pivotal connection 69'. Thus, by moving the handle member 64' to the right (in FIGURE 1) the pawl end 54 is disengaged from the ratchet wheel member against the resistance of the biasing spring 52'. A back stop 63' limits the back stroke afforded pawl 50 and thereby indirectly protects the release mechanism 60' against damage.

Operation

Upon the application of foot pressure, to depress the brake pedal lever 20, the lever arm ends 23 and 24 are pivoted away from the mounting plate end 11. The pawl 40 moves out of engagement with the abutment 45 and is urged by spring 42 into engagement with the brake cable tensioning member 30, the pawl end 43 engaging the ratchet teeth 31 thereof.

The pawl 40 causes the ratchet wheel member 30 to pivot on the pin connection 16 and to first take up the slack in the brake cable 34 and then to tension the cable.

The pawl 50 ratchets over the teeth 32 on the wheel member as they pass thereunder. However, at the end of the brake pedal stroke, the pawl 50 has its end 54 disposed in locking engagement with the teeth. The pawl 50 is held engaged with the ratchet wheel member under pressure of spring 52 and thereby holds the cable tensioning member in its advanced position.

The pawl 40 ratchets over the teeth 31 on its return stroke. Such return stroke is caused by the tensioning effort of spring 22 in returning the brake pedal lever 20 to its original position. The brake pedal lever 20 engages the bumper stop 44 at the end of its return travel, and disposes the end of pawl 40 in engagement with the abutment 45. Such engagement raises the pawl end 43 out of engagement with the ratchet wheel member 30.

If the brake mechanism is not set to satisfaction, the brake pedal lever is stroked a second time. The course of operation just mentioned is repeated and the ratchet wheel 30 is rotated a bit further. The holding pawl 50 engages and holds the cable tensioning ratchet wheel member 30 in a further lowered position, and the pawl 40 is again returned to an inactive position upon the release of the brake pedal.

To release the parking brakes, the release mechanism 60 is activated. A slight vertical pressure on the end of the handle and rod control 64 will pivot the cam member 61 into engagement with the pawl end 53. The cam end 65 rotates the pawl 50 on its pivoted connection 51 and out of holding engagement with the cable tensioning member 30. Since the pawl 40 is inactively disposed, the arcuate member is free to return to its initial cable slacked position.

The alternate release mechanism 60', where used, merely requires a horizontal pull on the control rod and handle 61' to disengage the pawl 50 from the arcuate member and achieve the result last mentioned.

The drawing and the foregoing specification constitute a description of the improved foot operated brake actuating mechanism in such full, clear, concise and exact terms as to enable any person skilled in the art to practice the invention, the scope of which is indicated by the appended claims.

What I claim as my invention is:

1. A cable operating device comprising a stationary mounting bracket, a ratchet wheel having a cable secured thereto pivoted to said bracket for incremental pivotal movement in one direction to tension said cable, a stationary pivot pin secured to the bracket, a pawl pivotally mounted on the pivot pin and biased into engagement with said ratchet wheel for securing said ratchet wheel in each incremental position thereof, release means for disengaging said pawl from said ratchet wheel to permit movement of said ratchet wheel in the opposite direction to relieve the tension on said cable, a lever biased into a predetermined position also pivoted to said bracket in a fixed location and having a motion communicating pawl pivoted thereon which pawl is biased to drivingly engage said ratchet wheel on pivoting of said lever in one direction from said predetermined position, and means distinct from said release means for disengaging said motion communicating pawl from said ratchet wheel on return of said lever to said predetermined position whereby said ratchet wheel is caused to move in said one direction in increments on successive pivotal strokes of said lever and to freely move in the opposite direction under influence of said cable on release of said stationary pawl.

2. A cable operating device comprising a stationary mounting bracket, a ratchet wheel having a cable secured thereto pivoted to said bracket for incremental pivotal movement in one direction to tension said cable, a stationary pivot pin secured to the bracket, a pawl pivotally mounted on the pivot pin and biased into engagement with said ratchet wheel for securing said ratchet wheel in each incremental position thereof, release means for disengaging said pawl from said ratchet wheel to permit movement of said ratchet wheel in the opposite direction to relieve the tension on said cable, a lever biased into a predetermined position also pivoted to said bracket in a fixed location and having a motion communicating pawl pivoted thereon which pawl is biased to drivingly engage said ratchet wheel on pivoting of said lever in one direction from said predetermined position, an abutment on said mounting bracket, said motion communicating pawl including an extension thereon engageable with said abutment as the lever approaches said predetermined position to pivot said motion communicating pawl out of engagement with said ratchet wheel whereby said ratchet wheel is caused to move in said one direction in increments on successive pivotal strokes of said lever and to freely move in the opposite direction under influence of said cable on release of said stationary pawl.

References Cited in the file of this patent

UNITED STATES PATENTS

| | | |
|---|---|---|
| 2,308,898 | Skareen | June 19, 1943 |
| 2,507,997 | Roedding et al. | May 16, 1950 |
| 2,905,024 | McCarthy et al. | Sept. 22, 1959 |
| 2,940,334 | Koskela | June 14, 1960 |